US005973802A

United States Patent [19]
Hirota et al.

[11] Patent Number: 5,973,802

[45] **Date of Patent: *Oct. 26, 1999**

[54] IMAGE REPRODUCING APPARATUS FOR FORMING EITHER OF A COLOR IMAGE OR A MONOCHROMATIC IMAGE

[75] Inventors: Yoshihiko Hirota; Katsuhisa Toyama, both of Toyokawa; Kazuhiro Ishiguro, Toyohashi, all of Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/611,754

[22] Filed: Mar. 6, 1996

[30] Foreign Application Priority Data

Mar. 7, 1995 [JP] Japan .................................... 7-047310

[51] Int. Cl.[6] ................................ G03F 3/08; H04N 1/46

[52] U.S. Cl. .......................... 358/521; 358/501; 358/518; 395/109

[58] Field of Search .................................... 358/521, 518, 358/501; 395/109

[56] References Cited

U.S. PATENT DOCUMENTS

| | | | |
|---|---|---|---|
| 4,978,226 | 12/1990 | Moriya et al. | 358/76 |
| 5,016,097 | 5/1991 | Shimano | 358/79 |
| 5,165,071 | 11/1992 | Moriya et al. | 358/443 |
| 5,181,105 | 1/1993 | Udagawa et al. | 358/80 |
| 5,289,566 | 2/1994 | Walker et al. | 395/132 |

*Primary Examiner*—Kim Yen Yu
*Assistant Examiner*—Kimberly A. Williams
*Attorney, Agent, or Firm*—Sidley & Austin

[57] ABSTRACT

When a monochromatic image is reproduced, a user can select desired mixing coefficients of red, green and blue in order to control gradation data for the reproduction of a monochromatic image as well as a monochromatic reproduction color. When a document is automatically determined not to be a color document, the mixing coefficients of red, green and blue are changed according to the type of the document. If a monochromatic copy mode is selected, the mixing coefficients can be set manually. Preferably, in order to help a user to select mixing coefficients, a plurality of images of monochromatic colors of various mixing coefficients of red, green and blue can be printed on a single sheet of paper.

31 Claims, 13 Drawing Sheets

IMAGE REPRODUCING APPARATUS FOR FORMING EITHER OF A COLOR IMAGE OR A MONOCHROMATIC IMAGE

BACKGROUND OF THE INVENTION

1. Field of the Invention

The present invention relates to a full color digital image reproducing apparatus such as a full color copying machine which can also reproduce a monochromatic image in addition to a full color image.

2. Description of the Prior Art

A full color digital image reproducing apparatus, such as a full color copying machine, has a monochromatic color copy mode in addition to a full color copy mode. In the monochromatic color copy mode, gradation data are obtained from color data of red, green and blue, and a monochromatic image is reconstructed from the gradation data for color data of cyan or the like.

However, the monochromatic color mode has problems. Spectral luminous efficiency of human eyes corresponds to a mixing ratio of about 3:6:1 for three primary colors of red, green and blue. Then, yellow having a low mixing ratio becomes whitish yellow, and red becomes thin. Then, a reproduced image seems to be strange as compared to an actual image. Further, the reproduced image is insufficient even for reproducing monochromatic information and for communicating information in the image.

Then, it may be proposed to provide gradation data for flat or average frequency characteristic by using a mixing ratio of 1:1:1 for three primary colors of red, green and blue. However, in this case, differences in colors may not be reproduced as differences in gradations when various color information exists in a document. For example, even an image in a back face of a document may be reproduced, or a colored background may be reproduced for example when a document has a colored background.

Further, usually, a user selects a reproduction color by designating a name of the color. However, the name of the color does not necessarily agree with a color desired really by a user. Further, a color reproduced by a machine may not be necessarily kept the same when there is a change in an environment thereof.

SUMMARY OF THE INVENTION

An object of the present invention is to provide an image forming apparatus which forms a monochromatic image having gradation data according to an intent or a desire of a user.

In one aspect of the invention, an image forming apparatus, which forms a full color image, forms a monochromatic image according to digital image data of red, green and blue of a document and mixing coefficients therefor. When the image is formed with a monochromatic color, the digital image data of red, green and blue are mixed with the mixing coefficients. In an example, first mixing coefficients are determined to generate gradation data of an average of the image data of red, green and blue, while second mixing coefficients are determined to generate gradation data according to visual efficiency of the image data of red, green and blue. It is a feature of the invention that different mixing coefficients may be used even for the same monochromatic color. A plurality of designation means are provided in the image forming apparatus, where the first designation means designates first mixing coefficients of the image data of red, green and blue and a first reproduction color for forming a monochromatic image of the document, and the second designation means designates second mixing coefficients of the image data of red, green and blue, different from the first mixing coefficients, and a second reproduction color for forming a monochromatic image of the document. For example, the first designation means is selected automatically when it is decided that a document is a monochromatic document, and the second designation means is manually selected when a monochromatic copy is desired by a user. Then, gradation data for monochromatic reproduction are generated from the digital image data by using the first or second mixing coefficients, and an image is formed according to the gradation data. Thus, if the same color is designated as the first reproduction color and as the second one, the first mixing coefficients are different from the second ones, and different gradation data for monochromatic reproduction are generated for the first and second mixing coefficients.

In a second aspect of the invention, a document type determination means is provided to determine a document type in an image forming apparatus, which forms a full color image or a monochromatic image, according to digital image data of red, green and blue of a document mixed with mixing coefficients. A designation means designates a reproduction color for forming a monochromatic image, and mixing coefficients are determined according to the document type. Thus, gradation data are generated for monochromatic reproduction from the digital image data by using the mixing coefficients of the image data of red, green and blue. A controller supplies mixing coefficients determined according to the document type. It is a feature that the controller comprises a memory means for storing a plurality of mixing coefficients of the image data of red, green and blue, wherein default mixing coefficients are provided for a plurality of document types. Then, even when an image of the same monochromatic color is formed, if the document type is different, the gradation data becomes different. For the ease of a user for selecting mixing coefficients, it is possible to form a plurality of images of an original image on a single sheet of paper with a plurality of mixing coefficients, and a user can determine desired mixing coefficients among them by referring to the images.

A first advantage of the present invention is that a user can obtain a different monochromatic image by designating mixing coefficients even when the same monochromatic reproduction color is designated.

A second advantage of the present invention is that a user can obtain a monochromatic image of a document easily by setting appropriate mixing coefficients for document types.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
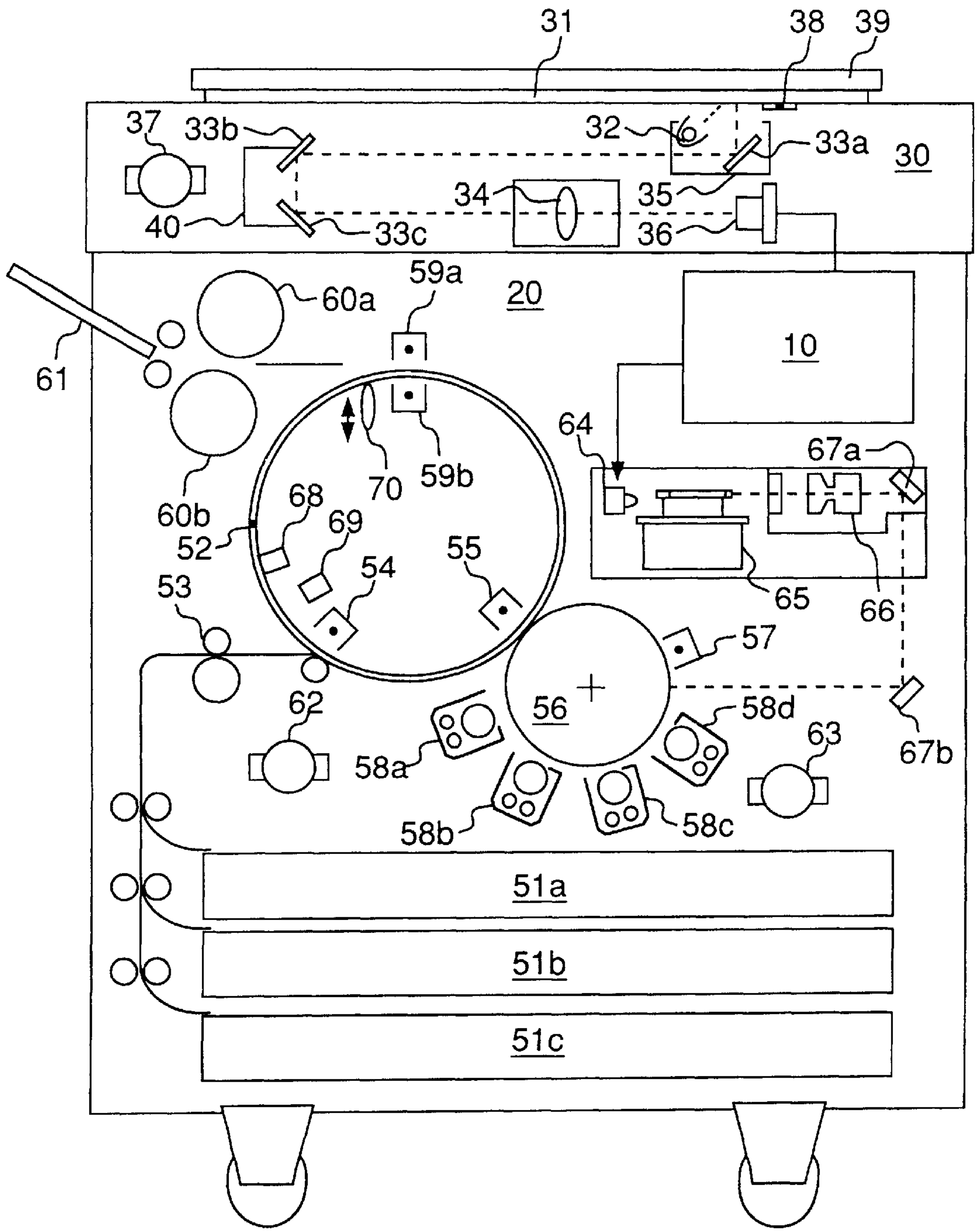
FIG. 1 is a diagrammatic view of a digital color copying machine.

Referring now to the drawings, wherein like reference characters designate like or corresponding parts throughout the drawings, embodiments of the invention are described.

A. Digital Full Color Copying Machine

FIG. 1 shows a digital full color copying machine comprising an image scanner 30, a signal processor unit 10 and a printer section 20. The image scanner 30 reads a document image and the digital signal processor unit 10 processes the signals read by the image scanner 30. The printer section 20 prints a full color image or a black image on a paper sheet according to the signals received from the digital signal processor unit 10. An outline of the digital copying machine is explained below.

In the image scanner 30, a document is put on a platen glass 31 and covered with a plate 39, or it is fed onto a platen 31 by an automatic document feeder (not shown) if mounted. A white plate 38 for shading correction is provided at an edge of the platen glass 31. The document is exposed by a lamp 32, and a light reflected from the document is guided through mirrors 33*a*, 33*b* and 33*c* and focused by a lens 34 onto a linear full color sensor (CCD) 36 to be converted to electric signals of components of red, green and blue. Then, they are sent to the signal processor 10. When the document image is read, a first slider 35 and a second slider 40 are mechanically moved by a motor 37 at a speed of V and at a speed of V/2 along a longitudinal direction perpendicular to an electrical scan direction of the sensor 36 so that the entire document is scanned. The image processor 10 processes the signals electrically to output components of magenta (M), cyan (C), yellow (Y) and black (Bk) and sends them to the printer section 20.

In the printer section 20, the image signals of C, M, Y and Bk received from the image processor 10 are used to drive a laser diode 64, and a laser beam emitted by the laser diode 64 propagates through a polygon mirror 65, an f-θ lens 66, mirrors 67*a* and 67*b* to expose a rotating photoconductor drum 56 charged beforehand by a charger 57 so as to form an electrostatic latent image. One of four development unit 58*a*, 58*b*, 58*c* and 58*d* of toners of cyan, magenta, yellow and black is selected to develop the latent image with toners. On the other hand, a sheet of paper supplied from a cassette 51*a*, 51*b* or 51*c* is carried by timing rollers 53 to be wound on a transfer drum 52 with an adsorption charger 54. It is carried further to a transfer portion, and the toner image on the photoconductor drum 56 is transferred by a transfer charger 55 onto the sheet of paper. The above-mentioned printing process are repeated for four colors of yellow, magenta, cyan and black. That is, toner images of the four colors, cyan, magenta, yellow and black, are transferred successively onto the sheet of paper. Then, the paper is separated by separation chargers 59*a*, 59*b* and a claw 70, from the transfer drum 52, passes through fixing rollers 60*a*, 60*b* for fixing the toner image and is discharged onto a tray 61.

B. Image Signal Processing

Figure 2A:
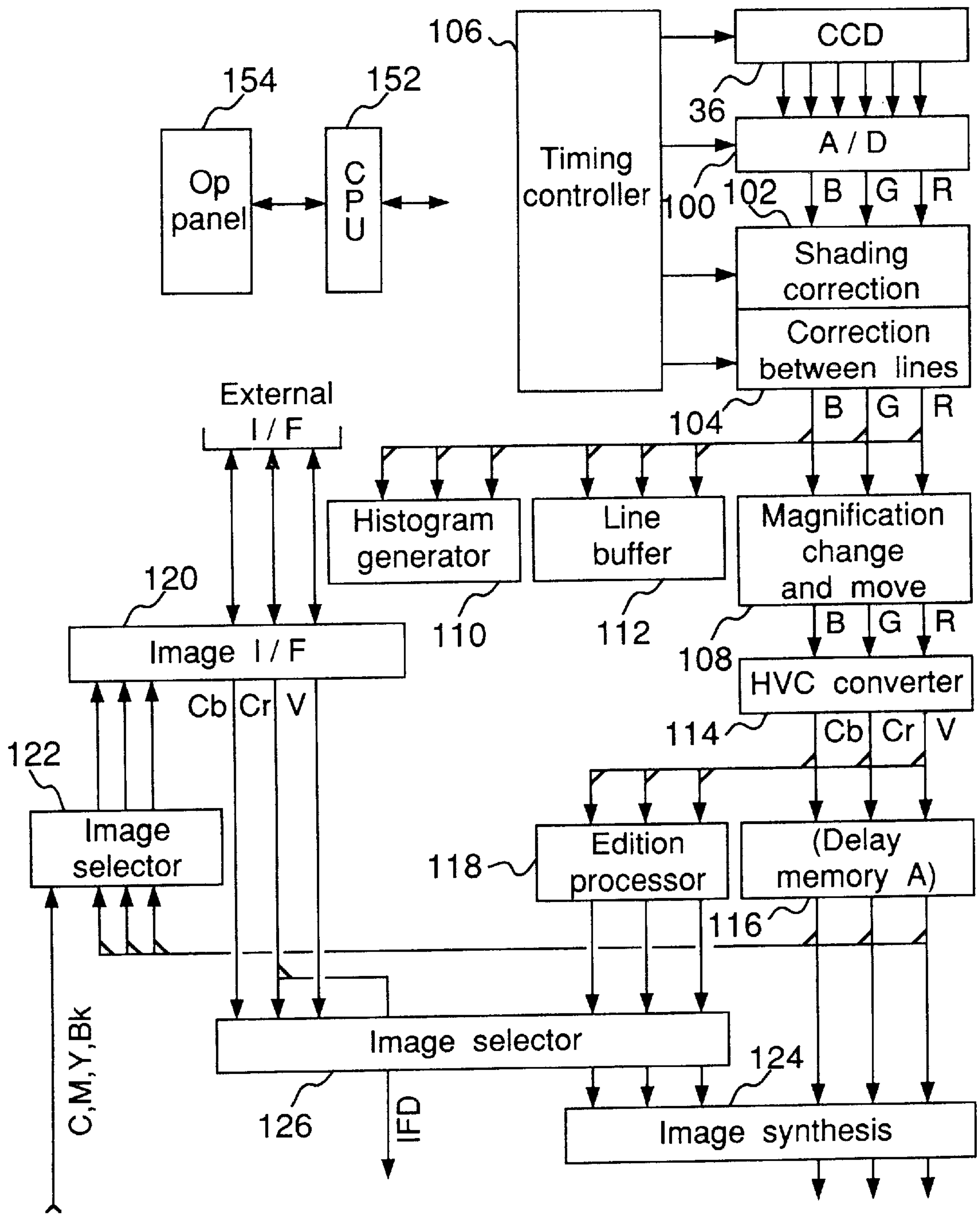
FIGS. 2A and 2B are block diagram of a signal processor.
Figure 2B:
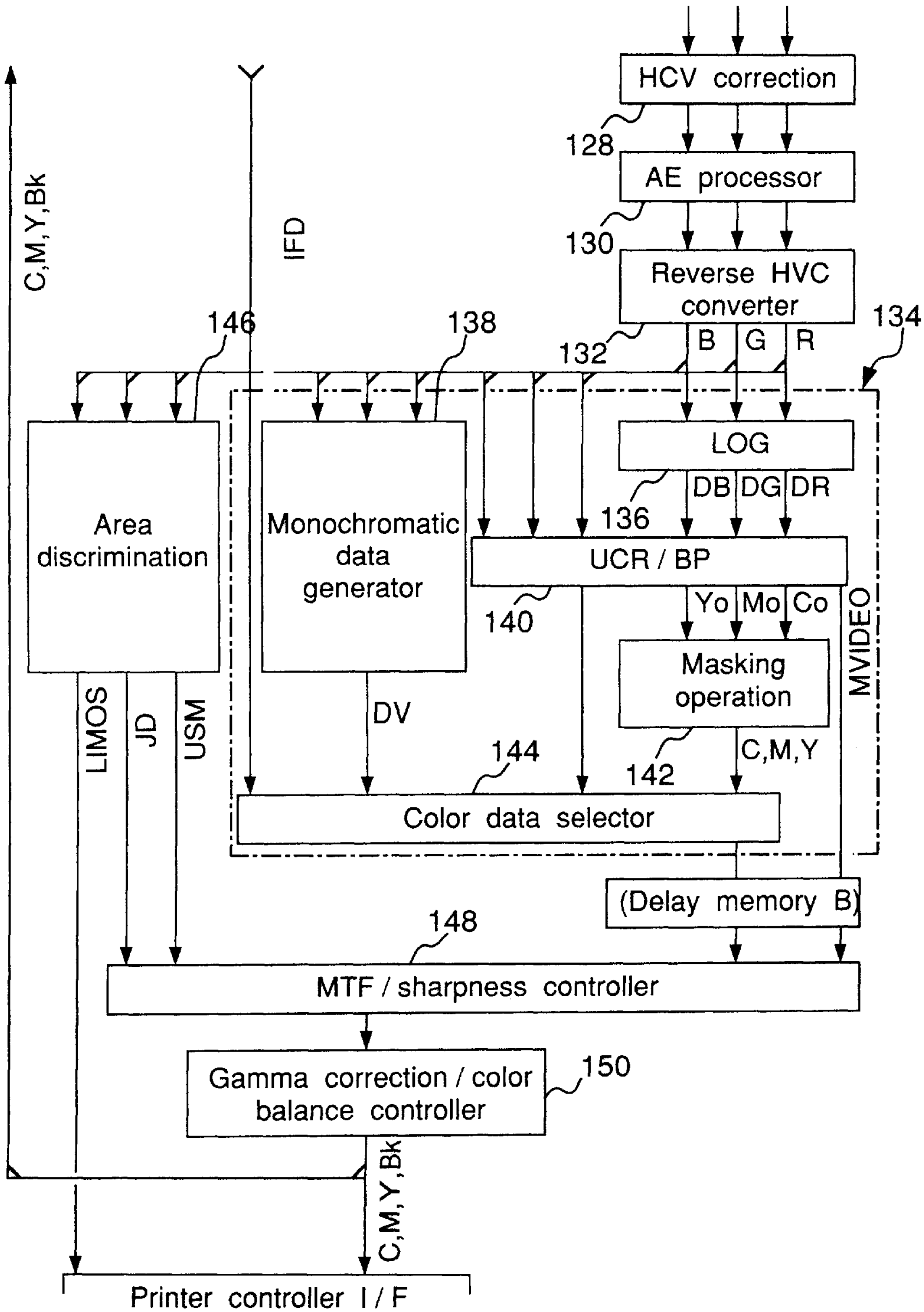

Next, image signal processing in the signal processor 10 is described. FIGS. 2A and 2B show image processing in the signal processor 10. As explained above, the signal processor 10 receives analog image signals of 400 dots per inch of red, green and blue from the linear CCD sensor 36 on which a light reflected from a document is focused. In the A/D conversion section 100, the analog image signals are converted to 8-bit digital data (256 gradation levels) of red (R), green (G) and blue (B). In order to eliminate scattering of reading of a quantity of light among CCD elements in the sensor 36 along a main scan direction for each of red, green and blue, a shading correction section 102 has reference data, read on the white plate 38, stored in a memory (not shown), and when a document image is read, the data in the memory is converted to an inverted value thereof, and it is multiplied with a data on the document for shading correction. Next, a line correction section 104 adjusts the output of the data after shading correction according to positions of chips of red, green, and blue provided in the color CCD sensor 36. A timing controller 106 controls timings for the CCD sensor 36, the A/D conversion section 100, the shading correction section 102 and the line correction section 104. Then, the line correction section 104 sends the R, G and B data to a line buffer 112 and a histogram generator 110.

The magnification change and move section 108 has two linear memories, and magnification change and movement of data along a main scan direction along the CCD sensor 36 are controlled by changing timings of write and read to and from the memories. In this section, image repeat, amplification, reduction, mirror processing and the like can be performed. In the image monitor explained later, for example eight images are reproduced on a single sheet of paper, and the magnification change and move section 108 can designate positions of the images or the like.

The histogram generator 110 (FIG. 4) converts the R, G and B data obtained in a prescan to value signals V to generate histograms. By using the histograms of the value signals, automatic color selection, background level and document mode are set automatically. The histogram generator 110 will be explained in detail later.

An HVC converter 114 converts the R, G and B data to value signals (V) and color difference signals (Cr and Cb). An editing processor 118 performs editing such as color change on the data received from the HVC converter 114 according to an instruction from an editor provided as an option.

On the other hand, an image interface 120 receives V, Cr and Cb data through an image selector 122 and sends the image data to an external equipment, or it receives image data from the external equipment. In order to deal with various types of image data, the image interface 120 has a function to convert the V, Cr and Cb data to R, G and B signals, X, Y and Z signals, L*, a* and b* signals or the like, and vice versa. Further, C, M, Y and Bk data to be printed to the printer section 20 may be sent to the external equipment, and vice versa.

An image synthesis section 124 selects the V, Cr and Cb data received from the editing processor 118 or from the image selector 126 through the image interface 120, and performs image synthesis of the data with other data received from the HVC converter 114.

An HVC corrector 128 corrects the V, Cr and Cb data received from the image synthesis section 124 according to an instruction given via an operational panel 154, in order to adjust image quality by a user in correspondence to three human senses of value (V), hue (H) and chroma (C).

An automatic exposure processor 130 controls background level of a document on value signals according to information obtained by the histogram generator 110.

A reverse HVC converter 132 converts the V, Cr and Cb data again to R, G and B data.

In a color correction section 134, a LOG converter 136 converts the R, G and B data received from the reverse HVC converter 132 to density data DR, DG and DB, while a monochromatic data generator 138 generates value data V from the R, G and B data in a color copy mode and generates gradation data DV for a monochromatic copy in a black copy mode. An undercolor-remove/black-paint section 140 calculates a difference between a maximum and a minimum of the density data DR, DG and DB as color information and a minimum among DR, DG and DB as a black component. The DR, DG and DB data are subtracted by the minimum to generate cyan, magenta and yellow data Co, Mo and Yo, while black data Bk is generated based on the minimum to be sent to a color data selector 144. A masking operation section 142 converts the data Co, Mo and Yo to cyan, magenta and yellow data C, M and Y for color reproduction in the printer section 20, and sends them to the color data selector 144.

On the other hand, a region discrimination section 146 discriminates regions of a black character image, a dot image and the like, and generates a result (JD signal) and a correction signal (USM signal) based on the minimum MIN(R, G, B) and a difference between the maximum and the minimum (MAX (R, G, B)–MIN(R, G, B)). Further, a LIMOS signal is sent to the printer section 20 to define a duty ratio of an output period to a pixel period. The output period means a period when a signal is output. The LIMOS signal is set to improve compatibility of reproduction of black characters and granularity of toner image.

An MTF correction/sharpness control section 148 performs various processing such as edge emphasis or smoothing on the data according to results obtained by the image discrimination section 146 for correcting a copy image appropriately.

A gamma correction/color balance section 150 controls a gamma curve (gradation correction curve) and color balance of C, M, Y and Bk data automatically or according to instruction given by the operational panel 154. Then, the C, M, Y and Bk data and the LIMOS signal are sent to the printer section 20.

A CPU 152 controls the signal processor 10, and the operational panel 154 is used to give data and to display data.

Figure 3:
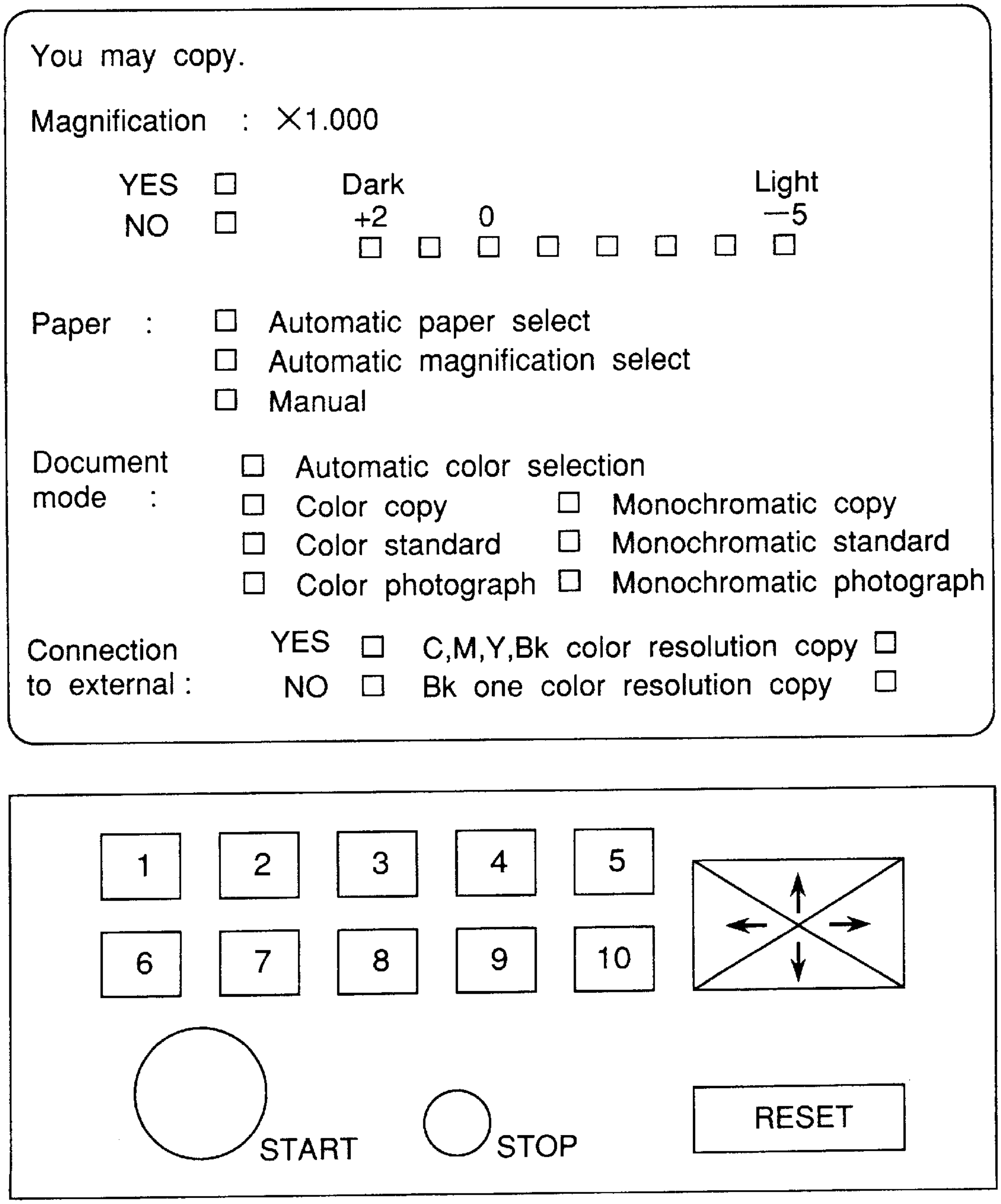
FIG. 3 is a diagram of a basic picture in an operational panel.

C. Selection of Mixing Coefficients and Monochromatic Color with Operational Panel Copy conditions of the copying machine are set with the operational panel 154. FIG. 3 shows a basic picture of the operational panel 154, and a user can set various copy modes and the like. In the basic picture, automatic color selection (ACS) or four kinds of document modes can be selected. If the automatic selection mode is selected, one of the four document modes is selected automatically according to determination of document type based on prescan. When it is decided that the document is be a black-and-white document, either of the monochromatic standard mode and the monochromatic photograph mode is selected automatically. When it is determined that the document is a color document, either of the color standard mode and the color photograph mode is selected automatically, and full color copy is performed by using image reproduction with cyan, magenta, yellow and black toners. The four document modes, that is, the color standard/photograph modes and the monochromatic standard/monochromatic photograph modes, may be selected manually. Standard document means a document including bi-level images such as characters, while photograph image means a half-tone image such as a photograph.

Figure 4:
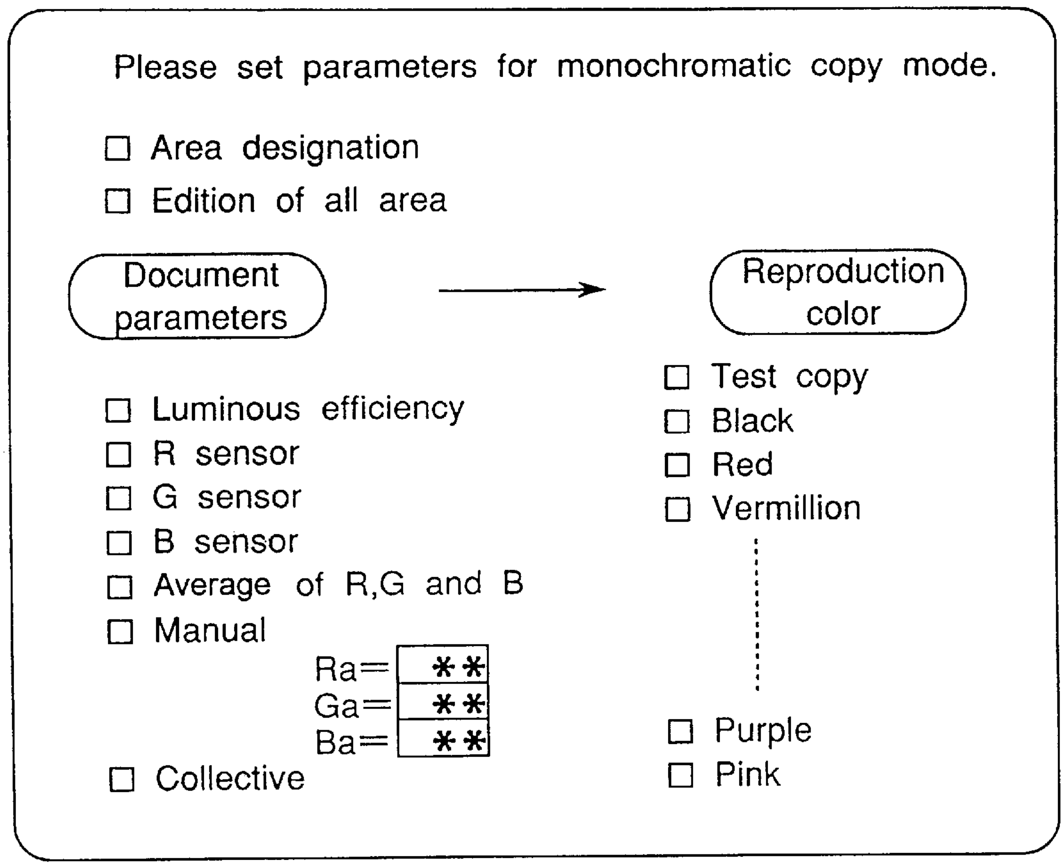
FIG. 4 is a diagram of a basic picture for black-and-white image in an operational panel.

When the monochromatic standard mode or monochromatic photograph mode is selected automatically or manually, the display in the operational panel is changed to a picture for monochromatic modes shown in FIG. 4. It is possible to designate an area to be reproduced in the monochromatic mode. A user selects mixing coefficients Ra, Ga and Ba of red, green and blue data as document parameters in order to determine gradation data for a monochromatic color. As a default data, the mixing coefficients of average sensitivity distribution of red, green and blue are set in the automatic color selection, while those of luminous efficiency are set for a manual mode. Then, when it is determined in the automatic color selection that the document is a black-and-white document, the mixing coefficients of average sensitivity distribution of red, green and blue are set in the automatic color selection, while when the monochromatic standard mode or the monochromatic photograph mode is selected, those of luminous efficiency are set.

Further, a monochromatic reproduction color can be selected among sixteen colors including black in the displayed picture shown in FIG. 4. In the monochromatic standard mode, a bi-level image having no gradation is reproduced with a selected reproduction color, while in the monochromatic photograph mode, a half-tone image having gradation is reproduced with a selected reproduction color.

A color resolution mode for reproducing C, M, Y or Bk data in color copy mode or for reproducing Bk data in black copy mode for each document can also be set, though detailed explanation thereof is omitted.

If automatic color selection is not set in the picture shown in FIG. 3, it is also possible to designate color copy mode or monochromatic copy mode manually. When monochromatic copy mode is selected, the picture shown in FIG. 4 for monochromatic reproduction is displayed in the operational panel 154, and mixing coefficients and monochromatic color are designated, but when color copy mode is selected, mixing coefficients and monochromatic color need not be specified.

D. Histograms of Image Data and Automatic Color Selection

Prescan is performed for automatic color selection (ACS). The scan unit 35 in the image scanner 30 is positioned near the white plate 38 for shading correction opposite to a document reference position for a normal scan, in order to shorten a first copy time. When the start button in the operational panel 154 is pressed, the light source 32 is turned on, and the scanner 30 scans the white plate 38 first and then scans a document to generate histogram data thereof. Then, it returns to the document reference position. Automatic color selection is determined according to the generated histogram data, and a normal scan is started.

Figure 5:
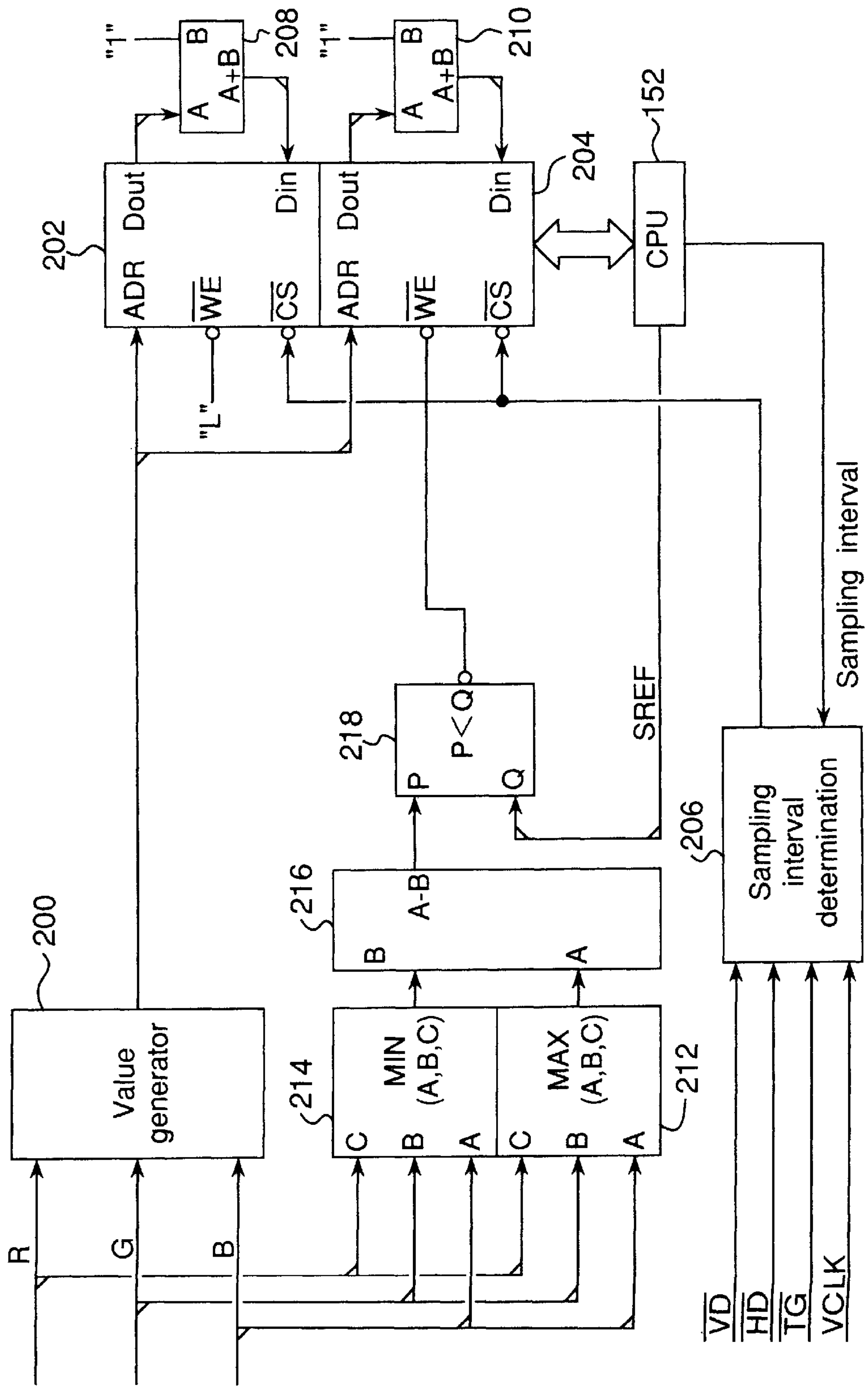
FIG. 5 is a block diagram of a histogram detector.

Next, generation of histograms in a prescan is explained. FIG. 5 shows the histogram generator 110 which generates histograms on a document area in a prescan. The histogram generator 110 has first and second histogram memories 202 and 204, and before a prescan, the two histogram memories 202 and 204 are initialized by writing "0" thereto at addresses of gradation levels of 0–255. A value generator 200 receives the 8-bit R, h and B data and converts them to a value signal VH according to a following equation to be sent as an address signal to the first and second histogram memories 202 and 204:

$$VH=0.31640625*R+0.65625*G+0.02734375*B \quad (1)$$

The value signal Vt obtained resembles human sensitivity for observing an object.

Figure 6:
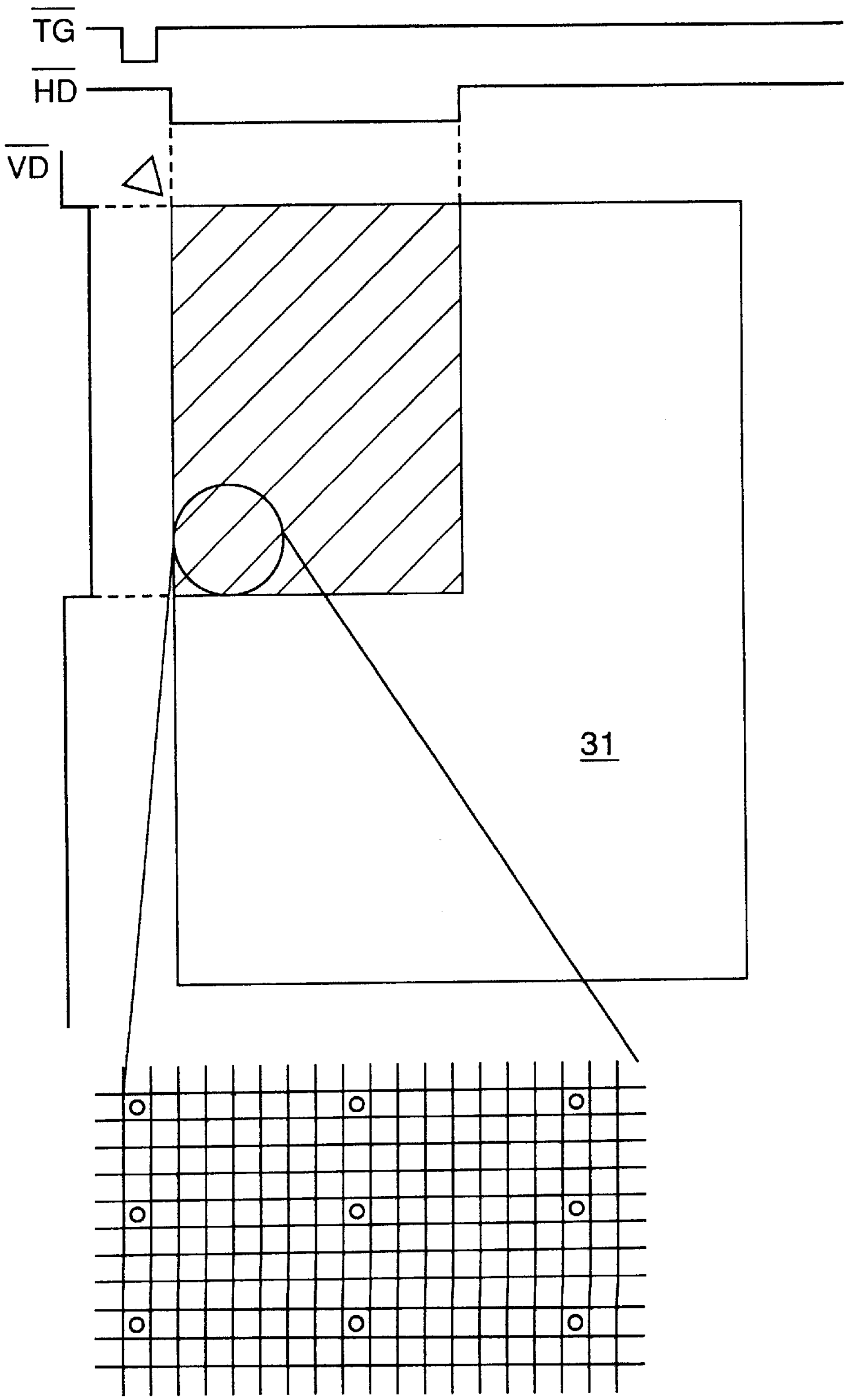
FIG. 6 is a diagram for illustrating sampling in generating a histogram.

A sampling interval circuit 206 determines intervals is (a thinning out ratio) for storing data in the histogram memories 202 and 204. This sampling is performed to reduce a memory capacity for prescan. If a histogram of all dots in a maximum document size of A3 is generated, a memory capacity of 32 megabits is needed. Then, in order to reduce the memory capacity to 1 megabits, as shown in FIG. 6, data are sampled for every eight dots along the main scan direction and for every four dots along the subscan direction for a document on plater 31. In FIG. 6, dots denoted by circles are sampled in an effective document area represented with hatching.

A document size has been detected before a prescan, and the sampling interval circuit 206 receives various signals for sampling from the timing controller 106. Among the signals, signals $\overline{HD}$ and $\overline{VD}$ are generated in a document area along the main scan direction and along the subscan direction. Then, the sampling interval circuit 206 allows generation of a histogram only in the document area determined by the signals $\overline{HD}$ and $\overline{VD}$. A signal $\overline{TG}$ denotes a synchronization clock signal along the main scan direction, and it is generated for each line. A signal VCLK denotes a synchronization clock signal of image data.

As to the histogram memories 202 and 204, a read modify write cycle is performed for a period of eights dots. An address ADR of the histogram memory 202, 204 corresponds to value data (value gradation level), while data at the address represents a frequency at the gradation level. When an address ADR is sent to the histogram memories 202, 204, data (frequency) at the address are read, and one is added to them by adders 208, 210, and the sums are written to the histogram memories 202, 204 at the same address. After a prescan is completed, the CPU 152 reads gradation data from the histogram memories 202 and 204.

Two histogram memories 202 and 204 are used for automatic color selection. It is noted that data on all the dots can be written to the memory 202 because the $\overline{WE}$ input of the first histogram memory 202 is always kept at L level. Thus, the first histogram memory 202 is used to generate a value histogram for a document simply. On the other hand, the second one 204 generates a histogram of achromatic dots in the document. In order to detect an achromatic dot, a maximum circuit 212 and a minimum circuit 214 detect a maximum (MAX) and a minimum (MIN) of input R, G and B data, and a subtraction circuit 216 calculates a difference between them. Then, a comparator 218 compares the difference (MAX−MIN) with a reference level SREF, and if the difference is smaller than the reference level, data is allowed to be written to the second histogram memory 204.

Automatic color selection is performed based on first and second histograms generated in the first and second histogram memories 202 and 204. As explained above, the histograms are generated on the value signals sampled in the effective document area; h1(n) denotes frequency data at a value level n of the first histogram generated by the first histogram memory 202, while h2(n) denotes frequency data at a value level n of achromatic dots in the second histogram generated by the second histogram memory 204.

Figure 7:
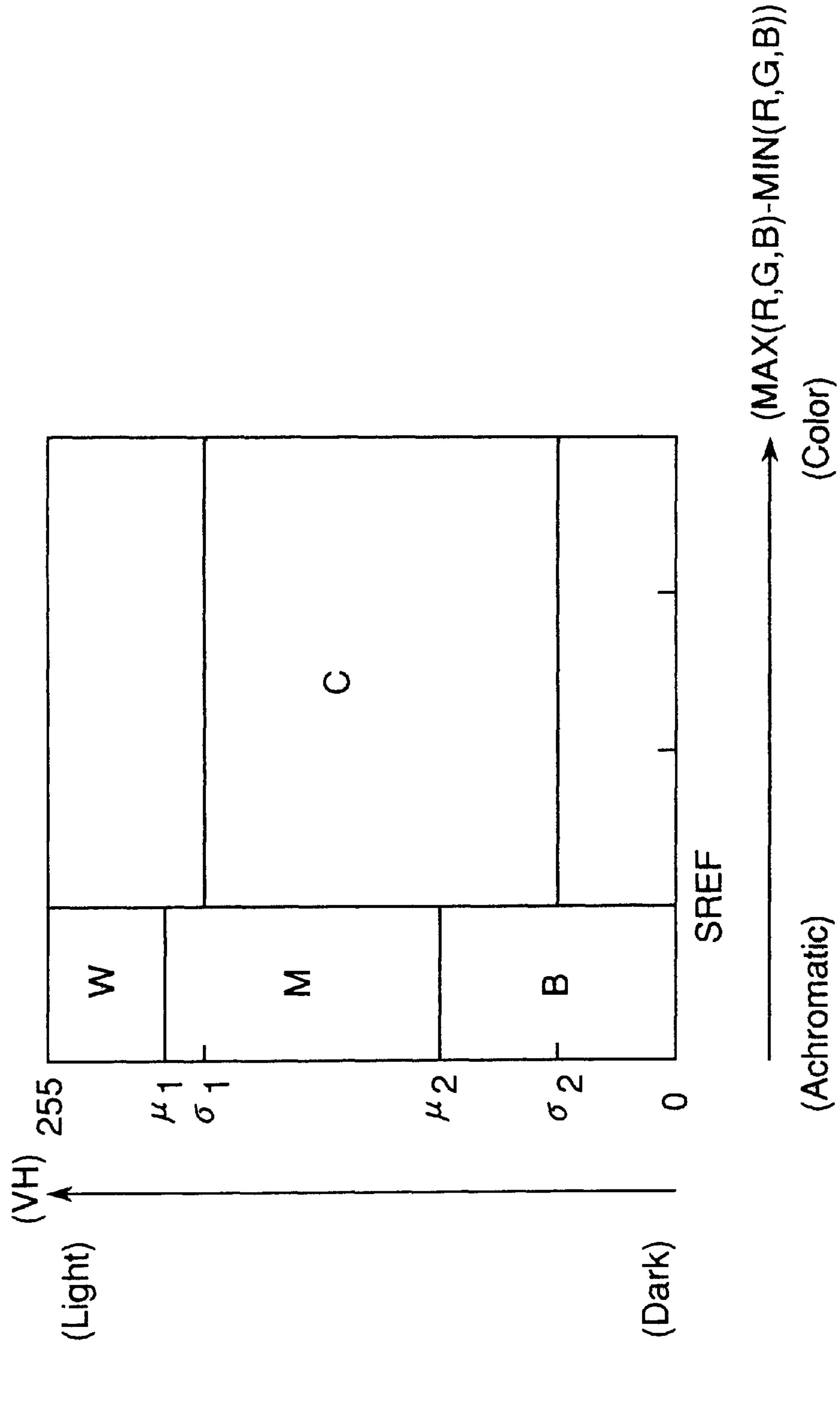
FIG. 7 is a diagram for illustrating various quantities obtained from the histogram.

Many quantities can be derived from the two histograms (h1(n) and h2(n)). Further, the CPU 152 generates a third histogram h3(n)=h1(n)−h2(n) by subtracting a frequency h2(n) of the second histogram memory 204 from a frequency h1(n) of the first histogram memory 202. The third histogram represents a histogram for chromatic dots in a document. As shown in FIG. 7, several quantities can be obtained from the histograms h1(n) and h3(n). A sum W is obtained for levels n between $\mu1$ and 255 from h1(n), and it represents a number of white dots, where a "dot" denotes each area detected by a linear CCD sensor 36 in a document. That is, W denotes a dot number of the white background in a document. A sum M is obtained for levels n between $\mu2$ and $\mu1$ from h1(n), and it represents a number of dots of half-tone (grey) regions. A sum B is obtained for levels n between 0 and $\mu2$ from h1(n), and it represents a number of dots in black areas. A sum C is obtained for levels n between σ2 and σ1 from h3(n) because dots of chromatic colors are counted.

$$W=\sum_{n=\mu1}^{255} h1(n) \quad (2)$$

$$M=\sum_{n=\mu2}^{\mu1} h1(n)$$

$$B=\sum_{n=0}^{\mu2} h1(n)$$

$$S=\sum_{n=0}^{255} h1(n)$$

$$C=\sum_{n=\sigma2}^{\sigma1} h3(n)$$

The sum C is obtained for levels n between σ2 and σ1 because dots of chromatic colors are counted.

In the automatic color selection mode, a document put on the platen 31 is discriminated to be a black-and-white document or a color document to determine a copy mode automatically. Then, a color document is reproduced with an image forming process of four colors (color copy mode). On the other hand, a black-and-white document is reproduced with an image forming process of only black toners (black copy mode), and a copy speed is improved for black copy. Especially, when an automatic document feeder is used, even if black-and-white documents and color documents are fed in a mixed way, appropriate copying conditions can be set for each document without manual operation by a user.

Figure 8:
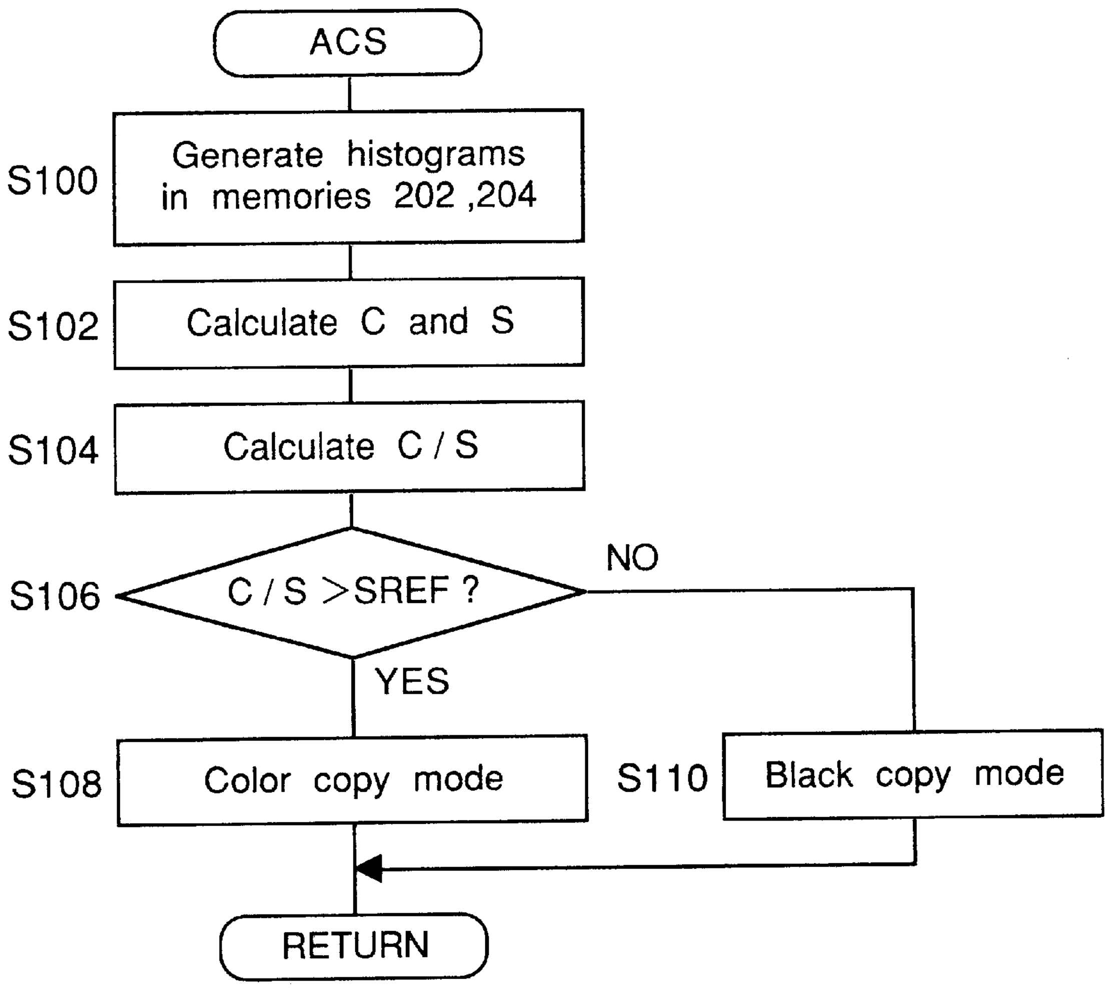
FIG. 8 is a flowchart of automatic color selection.

FIG. 8 shows a flowchart of color selection of the CPU 152. First, the histogram generator 110 generates histograms of value signal in the first and second histogram memories 202 and 204 (step S100). Next, C and S are obtained from the first and second histograms in the memories 202 and 204 (step S102), and a ratio C/S is calculated (step S104). If the ratio C/S is larger than the reference value SREF (YES at step S104), color copy mode is set (step S108), otherwise black copy mode is set (step S110).

E. Density Conversion and Generation of Monochromatic Data

As explained above with reference to FIG. 2, after data of red, green and blue are converted to HVC data, prescan data are processed, read data are processed for editing, synthesis and the like. Then, the HVC data are converted again to data of red, green and blue, and various processing for print out are performed. Because the data of red, green and blue converted again are quantities changing linearly with a quantity of light reflected from the document, they are converted to density data by the color correction section 134.

Figure 9:
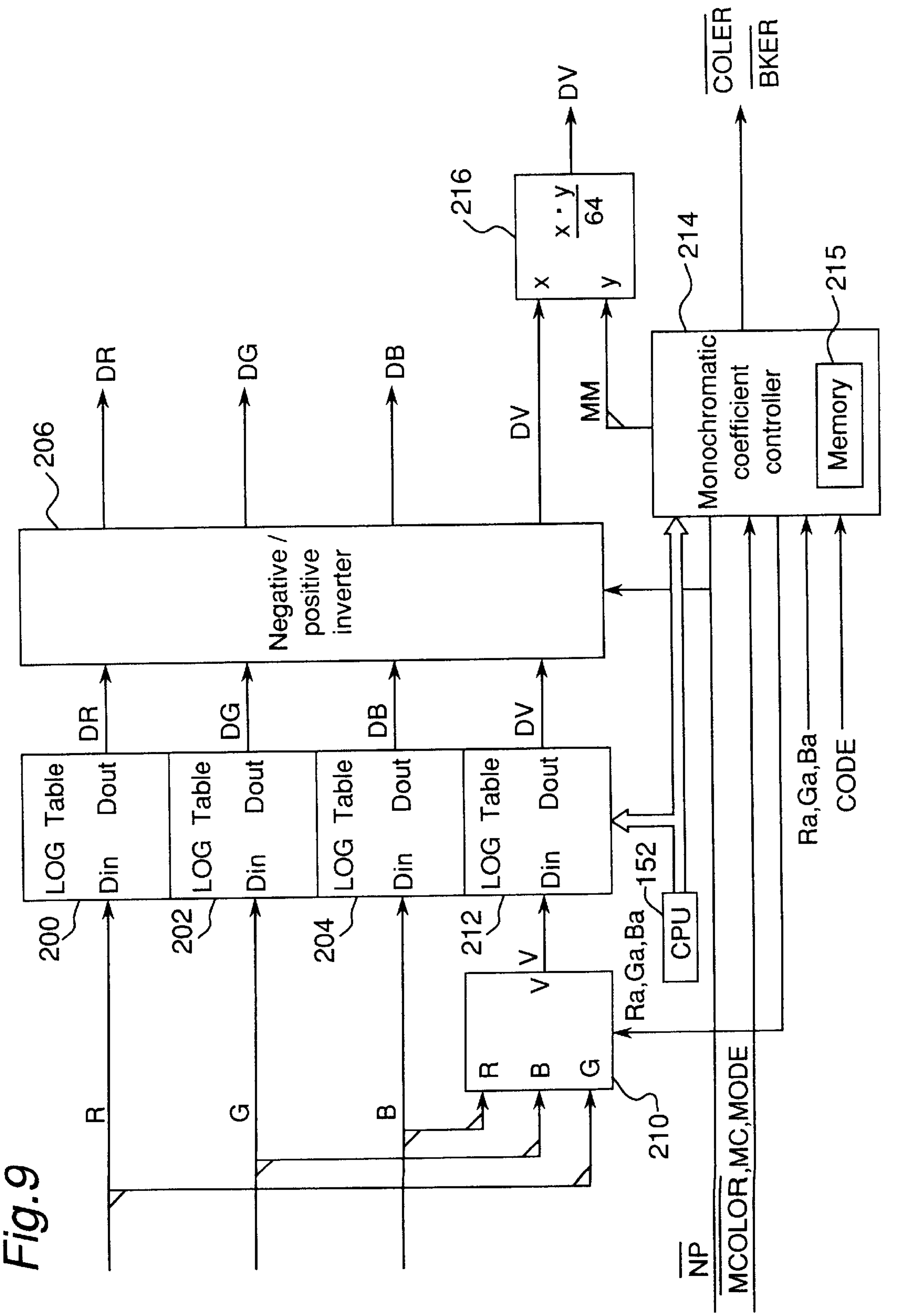
FIG. 9 is a block diagram of a LOG corrector and a black data generator.

FIG. 9 shows the LOG conversion section 136 and the monochromatic data generator 138 in the color correction section 134. For density conversion, the LOG conversion section 136 converts the 8-bit data of red, green and blue converted again to density data DR, DG and DB by using LOG tables 200, 202 and 204. A conversion formula is as follows:

$$D_{out}=\{-\log(Wh*(D_{in}/256))-D_{min}\}*256/(D_{max}D_{min}), \quad (3)$$

wherein $D_{max}$ denotes maximum density range, $D_{min}$ denotes minimum density range, and Wh denotes a standard reflection ratio in the shading correction section 102.

On the other hand, in the monochromatic mode, the monochromatic data generator 138 generates a value data V by a data generator 210 according to a mixing ratio of Ra:Ga:Ba or mixing coefficients Ra, Ga and Ba received from a monochromatic coefficient controller 214 and generates an 8-bit gradation data DV for reproduction of monochromatic image. The value data V is generated according to a following formula:

$$V=Ra*R+Ga*G+Ba*B, \quad (4)$$

wherein Ra, Ga and Ba denote mixing coefficients sent by the monochromatic coefficient controller 214. For example, if a color document is reproduced in monochromatic copy mode, Ra=0.316, Ga=0.656 and Ba=0.027 so that the value V is approximated as the luminous efficiency, because it is preferable that differences in colors in the document are reproduced as a difference in density. On the other hand, if a color document is reproduced in monochromatic copy mode, or if a document includes light blue lines as in a graph paper, or if a color such as red different from black is needed to be reproduced clearly, Ra=0.333, Ga=0.334 and Ba=0.333 or an average of each color data is reproduced, so that the value V does not depend on wavelengths of colors. The data are supplied to another LOG table 212 to convert then to density data DV. The monochromatic coefficient controller 214 receives coefficients Ra, Ga and Ba set in the manual mode, a signal MODE for designating a mode such as luminous efficiency mode, R sensor mode or the like set for document parameters in FIG. 4, a monochromatic area signal $\overline{\text{MCOLOR}}$, a 4-bit signal MC for designating a monochromatic color among sixteen colors set in FIG. 4, a 2-bit reproduction step signal CODE changing from 0 through 1 and 2 to 3 as reproduction steps progresses from cyan through magenta and yellow to black, and a $\overline{\text{NP}}$ signal for representing negative/positive inversion of image.

In the picture for monochromatic mode shown in FIG. 4 displayed in the operational panel 154, the mixing coefficients Ra, Ga and Ba (document parameters) of the luminous efficiency are set in luminous efficiency mode. Further, different mixing coefficients may also be used. In R, B and G average mode, Ra=0.333, Ga=0.334 and Ba=0.333 are set. Further, if R sensor mode is selected where only red is used for image reproduction, Ra=1.000, Ga=0.000 and Ba=0.000. Similarly, if G or B sensor mode is selected where only green or blue is used for image reproduction, Ra=0.000, Ga=1.000 and Ba=0.000, or Ra=0.000, Ga=0.000 and Ba=1.000 are set. Further, if manual mode is selected, the mixing coefficients Ra, Ga and Ba, inputted by the ten-key buttons in the operational panel 154, are received by the monochromatic coefficient controller 214. If collective copy mode is selected, copies of luminous efficiency mode, R sensor mode, G sensor mode, B sensor mode and average mode are outputted successively on papers. Then, the operator can determine which mode is best for reproducing the image and can select gradations which seems natural. A signal DP which designates the luminous efficiency mode, the average mode or the collective copy mode, or the mixing coefficients set manually are sent by the CPU 152 to the monochromatic coefficient controller 214. The monochromatic coefficient controller 214 has a memory 215 storing the mixing coefficients of the luminous efficiency mode, the average mode and the like to be designated and those to be set manually with the operational panel 154, and they are selected according to the signal DP and sent to the data generator 210.

The content of gradation data is changed automatically between the above-mentioned automatic color selection mode and a mode selected manually. In the automatic color selection mode where the copy mode is selected automatically, when it is determined that the document is a black-and-white document, the R, G, B average mode is selected as a default mode. In this case, because there is substantially no area including color information in the document, the R, G, B average mode is desirable in order to reproduce black and white clearly, more than the luminous efficiency mode where differences in color are expressed as those in density. In this case, a small red image in the document can also be reproduced clearly. On the other hand, if a monochromatic mode is selected in the manual setting, the mixing coefficients Ra, Ga and Ba of the luminous efficiency mode are selected as mentioned previously. Because a user desires a monochromatic copy of a color document when the user selects not the automatic color selection mode, but a monochromatic mode, the mixing coefficients of the luminous efficiency mode are preferable to reproduce differences in colors as differences in gradation clearly.

Further, in the picture displayed in the operational panel 154 shown in FIG. 4, one of sixteen reproduction colors can be selected. If test mode is selected, a sample image in a document image can be reproduced in the sixteen colors and printed on a single paper sheet. Then a user can decide on a reproduction image by observing the test copy. When a user selects a reproduction color by a name of a color in the picture of FIG. 4, a reproduced image of the color may be different from that desired by the user. However, such discrepancy can be prevented by observing the test copy.

Figure 10:
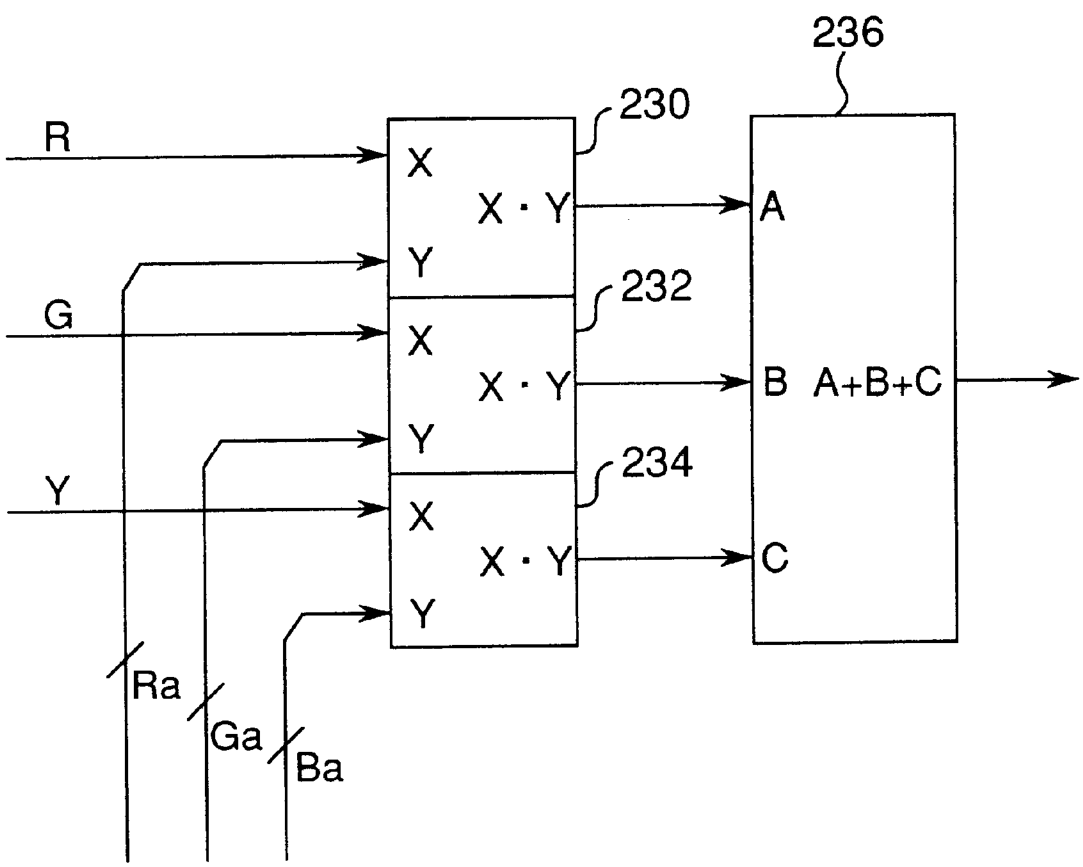
FIG. 10 is a block diagram of a value generator.

FIG. 10 shows the data generator 210. The R, G and B data are received at an input of 2-input multipliers 230, 232 and 234, respectively. The coefficients Ra, Ga and Ba generated by the monochromatic coefficient controller 214 are received at the other input of the 2-input multipliers 230, 232 and 234. The multipliers 230, 232 and 234 output products to an adder 236 which outputs value data V. As explained above, the data generator 210 generates monochromatic data V by using the mixing coefficients Ra, Ga and Ba.

By turning again to FIG. 9, the negative-to-positive converter 206 receives the density data DR, DG, and DB or DV, and it outputs inverted data (DR, DG, DB or DV=255−(DR, DG, DB OR DV)) when $\overline{\text{NP}}$="L", or outputs non-inverted data when $\overline{\text{NP}}$="H". The resultant density data DR, DG and DB are sent to the undercolor-remove/black-paint controller 140.

On the other hand, the density data DV for a monochromatic color is sent to a multiplier 216 multiplying it with a coefficient MM according to monochromatic reproduction color set by the monochromatic coefficient controller 214. The data DV is sent through the color data selector 144 to the MTF correction/sharpness controller 148.

In the setting of a reproduction color, if the color is red, MM=0 for development for cyan and black and MM=63 for development for magenta and yellow. The monochromatic coefficient controller 214 receives a 4-bit signal MC for designating a monochromatic color among sixteen colors and sends the monochromatic coefficient signal MM. That is, one of sixteen monochromatic colors can be selected in real time. The 4-bit signal MM sets a reproduction color as follows: black for MM=0, red for 1, vermillion for 2, orange for 3, brown for 4, bright yellow for 5, yellow for 6, yellowish green for 7, green for 8, bluish green for 9, light blue for 10, marine blue for 11, blue for 12, violet for 13, purple for 14 and pink for 15.

Further, the monochromatic coefficient controller 214 outputs $\overline{\text{BKER}}$="L" when $\overline{\text{MCOLOR}}$="Leg" and MC="L" or black is selected as a reproduction color. $\overline{\text{COLER}}$ becomes "L" when $\overline{\text{MCOLOR}}$="L" and MC≠"0" or a color other than black is selected.

F. Color Selector

Figure 11:
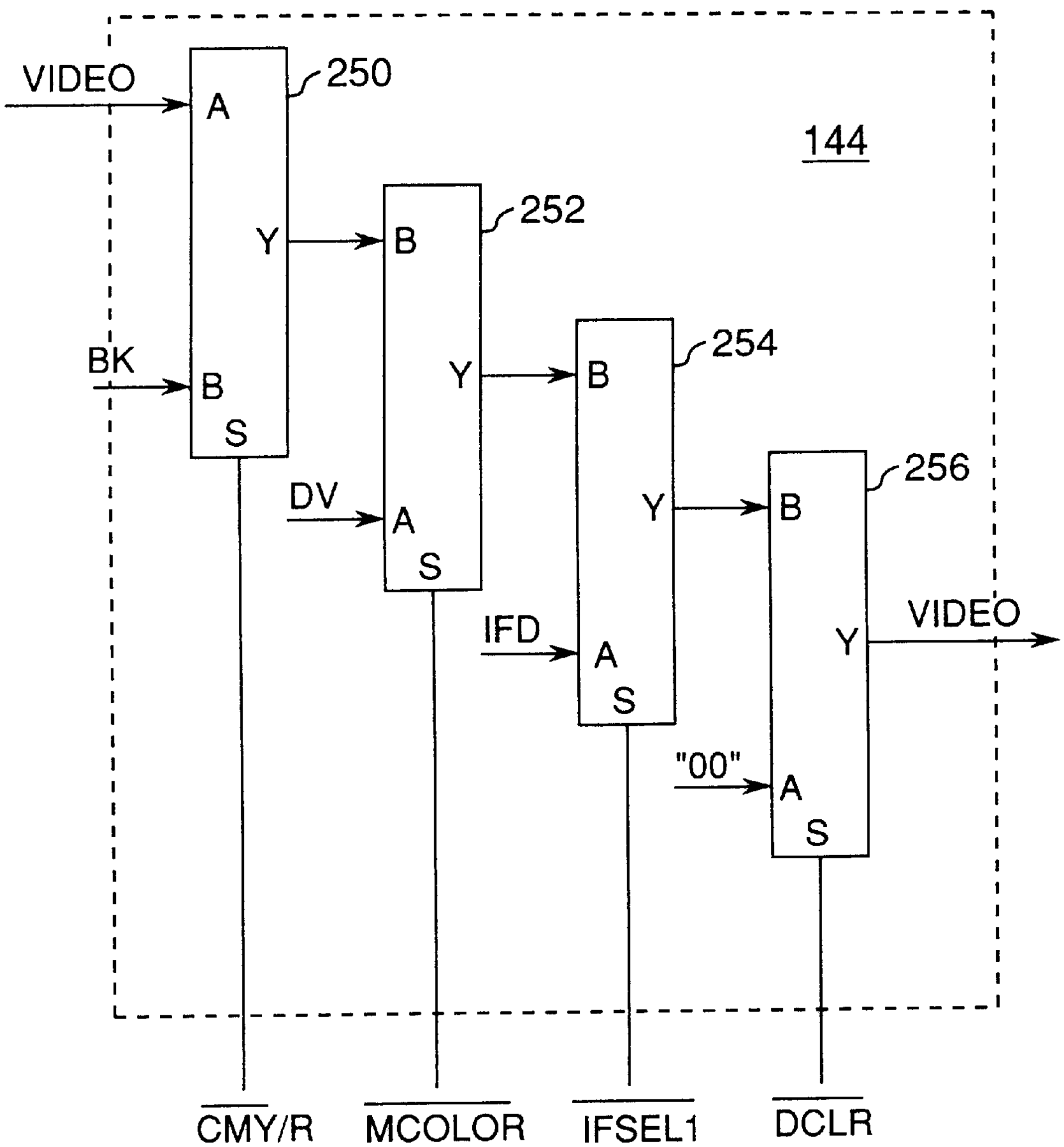
FIG. 11 is a block diagram of a color selector.

FIG. 11 is a block diagram of the color selector 144. Masking correction is performed to compensate differences from ideal characteristics of spectral characteristics of color resolution filters arranged for pixels of the CCD sensor 36 and light absorption characteristics of colored toners of yellow, magenta and yellow. Then, when the $C_o$, $M_o$ and $Y_o$ data outputted by the undercolor-remove/black-paint section 140 are converted to data C, M and Y, the masking operator 142 corrects the colors. In this example, a nonlinear masking technique is adopted to improve color reproduction. In the color data selector 144, a selector 250 selects cyan, magenta and yellow data (VIDEO) or black data (Bk) according to $\overline{\text{CMY/K}}$ signal in correspondence to reproduction step to output it as VIDEO signal. If $\overline{\text{MCOLOR}}$="L", the monochromatic data DV from the monochromatic data generator 138 is selected by a selector 252. If $\overline{\text{IFSEL}}$1="L", data IFD received from the image interface 120 is selected by a selector 254. Further, if $\overline{\text{DCLR}}$ received from the image synthesis section 124 is "L", "00" is selected by a selector 256 in order to substitute the image data with white.

G. Image Monitor

Figure 12:
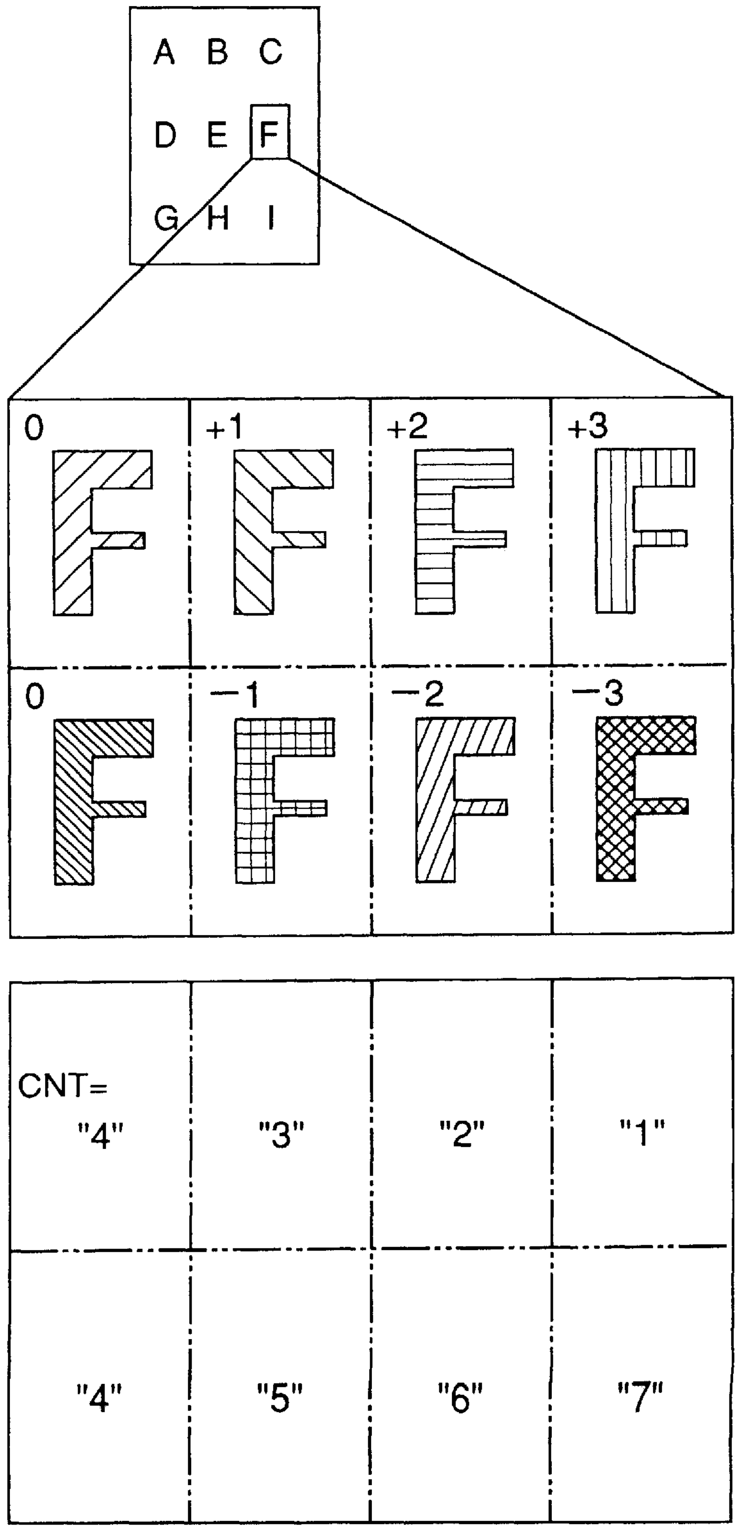
FIG. 12 is a diagram of an output image of an image monitor.

Image control is difficult for a user in a full color copying machine, and image monitor mode is provided to help the user to set desired copying conditions. In the image monitor mode, a part of a document image is reproduced repeatedly in eight images in a single paper, where each image has a different parameter for five kinds of image control parameters, that is, HVC matrix coefficient, sharpness (edge emphasis, smoothing level), gamma curve, color balance or mixing coefficients. Thus, as shown in FIG. 12, eight sample images are printed on a single paper. Then, a user selects one of the eight images in the picture shown in FIG. 4 in the operational panel 154 by observing the test copy in order to print a copy with desired image control, a copy is started by adopting the selected parameter.

When the image monitor is used for mixing coefficients as image control parameters, the mixing coefficients are changed so as to include the mixing coefficients designated by a user and to generate other mixing coefficients around the designated mixing coefficients, and a part ("F" in FIG. 12) of image data read with the CCD sensor 36 is repeated along the main scan and subscan directions for eight areas in an image memory. Then, an image monitor controller (not shown) outputs a 3-bit monitor area signal in synchronization with the eight areas, while the monochromatic coefficients controller 214 supplies various mixing coefficients for the eight areas.

In the above-mentioned copying machine, a monochromatic copy can be produced by setting various mixing coefficients for areas defined by the monochromatic area signal $\overline{\text{MCOLOR}}$, so that a natural image can be reproduced if desired, or a copy for each of R, G and B sensors can be outputted. Further, by printing sample images of monochromatic color of various mixing coefficients, a user can select desired mixing coefficients by observing the test print. Because default mixing coefficients are changed between the automatic color selection mode and the monochromatic mode, a user can obtain natural monochromatic copies easily for various modes.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image forming apparatus which can form either of a full color image and a monochromatic image, the apparatus comprising:

first designation means for designating first mixing coefficients of digital image data of red, green, and blue of a document and a first reproduction color for forming a monochromatic image of the document;

second designation means for designating second mixing coefficients of the image data of red, green, and blue, said second mixing coefficients being different from the first mixing coefficients, and a second reproduction color for forming a monochromatic image of the document;

selection means for selecting said first designation means or said second designation means, whereby mixing coefficients and a reproduction color for monochromatic reproduction are selected;

data generation means for generating gradation data for monochromatic reproduction from the digital image data of red, green, and blue by using the one of the first mixing coefficients and the second mixing coefficients which is selected by said selection means; and an image forming means for forming an image according to the gradation data generated by said data generation means with the one of the first reproduction color and the second reproduction color which is selected by said selection means.

2. The apparatus according to claim 1, wherein the first mixing coefficients designated by said first designation means are determined to generate gradation data of an average of the image data of red, green, and blue.

3. The apparatus according to claim 1, wherein the second mixing coefficients designated by said second designation means are determined to generate gradation data according to visual efficiency of the image data of red, green, and blue.

4. The apparatus according to claim 1, further comprising a document type determination means for determining, according to the image data, whether or not the document is a color document, wherein said selection means selects the first reproduction color when said document type determination means determines that the document is not a color document.

5. The apparatus according to claim 1, further comprising a document type determination means for designating monochromatic copy, wherein said selection means selects the first mixing coefficients when said document type determination means designates monochromatic copy.

6. The apparatus according to claim 1, wherein said selection means selects said first designation means when the image of the document has no gradation and said selection means selects said second generation means when the image of the document has gradation.

7. The apparatus according to claim 1, wherein said data generation means generates first gradation data corresponding to the first reproduction color and second gradation data corresponding to the second reproduction color, the second gradation data being different from the first gradation data when the first reproduction color and the second reproduction color are the same.

8. The apparatus according to claim 7, wherein the second mixing coefficients designated by said second designation means are determined to generate gradation data according to visual efficiency of the image data of red, green, and blue.

9. The apparatus according to claim 7, further comprising a document type determination means for determining, according to the image data, whether or not the document is a color document, wherein said selection means selects the first reproduction color when said document type determination means determines that the document is not a color document.

10. The apparatus according to claim 7, further comprising a document type determination means for designating monochromatic image formation, wherein said selection means selects the first mixing coefficients when said document type determination means designates monochromatic image formation.

11. The apparatus according to claim 7, wherein said selection means selects said first designation means when the image of the document has no gradation and said selection means selects said second designation means when the image of the document has gradation.

12. An image forming apparatus which can form either of a full color image and a monochromatic image, the apparatus comprising:

designation means for designating mixing coefficients of digital image data of red, green, and blue of a document and a reproduction color for forming a monochromatic image of the document;

data generation means for generating gradation data of red, green, and blue for monochromatic reproduction from the digital image data (received from said image reading means) by using the mixing coefficients;

converting means for converting from the gradation data of red, green, and blue to gradation data of yellow, magenta, and cyan; and image forming means for forming on a sheet of paper a plurality of images of an image according to the gradation data generated by said converting means with the reproduction color designated by said designation means.

13. An image forming apparatus which can form either of a full color image and a monochromatic image, the apparatus comprising:

first designation means for designating a first reproduction color for a monochromatic image and first mixing coefficients for image data of red, green, and blue for the first reproduction color;

second designation means for designating a second reproduction color for a monochromatic image and second mixing coefficients for image data of red, green, and blue for the second reproduction color, said second mixing coefficients being different from the first mixing coefficients;

data generation means for generating gradation data from digital image data of a document for monochromatic reproduction on the basis of the mixing coefficients designated by said first or second designation means; and a controller for controlling the gradation data generated by said data generation means on the basis of the first reproduction color designated by said first designation means and the gradation data generated by said data generation means on the basis of the second reproduction color designated by said second designation means, so as to generate different gradation colors even if the first reproduction color is the same as the second reproduction color.

14. The image forming apparatus according to claim 13, wherein said first designation means comprises a means for automatically designating the first reproduction color, and wherein said second designation means comprises a device for manually designating the second reproduction color.

15. The image forming apparatus according to claim 14, wherein said device of said second designation means comprises an operational panel.

16. The image forming apparatus according to claim 15, wherein said operational panel of said second designation means comprises a device for inputting a numerical value.

17. An image forming apparatus which can form either of a full color image and a monochromatic image, the apparatus comprising:

document type determination means for determining a document type according to digital image data of a document;

designation means for designating a reproduction color for forming a monochromatic image;

a controller for supplying mixing coefficients determined according to the document type determined by said document type determination means, said controller comprising a memory means for storing a plurality of mixing coefficients of the image data of red, green, and blue, wherein mixing coefficients are provided for each of document types to be determined by said document type determination means;

data generation means for generating gradation data for monochromatic reproduction from the digital image data by using mixing coefficients supplied by said controller; and an image forming means for forming an image according to the gradation data generated by said data generation means with the reproduction color designated by said designation means.

18. The apparatus according to claim 17, wherein said controller supplies first mixing coefficients of an average of the image data of red, green, and blue when the document type is decided to be a color document by said document type determination means and second mixing coefficients of visual efficiency of the image data of red, green, and blue when the document type is decided not to be a color document by said document type determination means.

19. An image forming apparatus which can form either of a full color image and a monochromatic image, the apparatus comprising:

designation means for designating a reproduction color for forming a monochromatic image of a document;

mode selection means for selecting a mode among a plurality of modes, each of the modes specifying mixing coefficients of digital image data of red, green, and blue of the document;

data generation means for generating gradation data for monochromatic reproduction from the digital image data by using the mixing coefficients according to the mode selected by said mode selection means; and an image forming means for forming an image according to the gradation data generated by said data generation means with the reproduction color designated by said designation means.

20. The apparatus according to claim 19, wherein modes to be selected by said selection means include a mode for specifying first mixing coefficients determined to generate gradation data of an average of the image data of red, green, and blue and another mode for specifying second mixing coefficients determined to generate gradation data according to visual efficiency of the image data of red, green, and blue.

21. An image processing apparatus which can process either of a full color image and a monochromatic image, the apparatus comprising:

first designation means for designating first mixing coefficients of digital image data of red, green, and blue of a document and a first reproduction color for representing a monochromatic image of the document;

second designation means for designating second mixing coefficients of the image data of red, green, and blue, said second mixing coefficients being different from the first mixing coefficients, and a second reproduction color for representing a monochromatic image of the document;

selection means for selecting said first designation means or said second designation means, whereby mixing coefficients and a reproduction color for monochromatic reproduction are selected; and data generation means for generating gradation data for monochromatic reproduction from the digital image data of red, green, and blue by using the one of the first mixing coefficients and the second mixing coefficients which is selected by said selection means.

22. An image processing apparatus which can process either of a full color image and a monochromatic image, the apparatus comprising:

first designation means for designating each of mixing coefficients of digital image data of red, green, and blue; and data generation means for generating gradation data for monochromatic reproduction from the digital image data of red, green, and blue by using the mixing coefficients designated by said first designation means.

23. The apparatus according to claim 22, further comprising:

second designation means for designating a reproduction color for representing a monochromatic image of the document; and an image reproducer which reproduces an image on the basis of the gradation data with said reproduction color.

24. An image processing apparatus which can process either of a full color image and a monochromatic image, the apparatus comprising:

document type determination means for determining a document type according to digital image data of a document;

a controller for supplying mixing coefficients according to the document type determined by said document type determination means, said controller comprising a memory means for storing a plurality of mixing coefficients of the image data of red, green, and blue, wherein mixing coefficients are provided for each of document types to be determined by said document type determination means; and data generation means for generating gradation data for monochromatic reproduction from the digital image data by using mixing coefficients supplied by said controller.

25. The apparatus according to claim 24, wherein said controller supplies first mixing coefficients of an average of the image data of red, greens and blue when the document type is decided to be a color document by said document type determination means and second mixing coefficients of visual efficiency of the image data of red, green, and blue when the document type is decided not to be a color document by said document type determination means.

26. An image processing apparatus which can process either of a full color image and a monochromatic image, the apparatus comprising:

first designation means for designating each of first mixing coefficients of image data of red, green, and blue;

second designation means for designating a first reproduction color for representing a monochromatic image of the document;

third designation means for designating each of second mixing coefficients of the image data of red, green, and blue, said second mixing coefficients being different from the first mixing coefficients;

fourth designation means for designating a second reproduction color for representing a monochromatic image of the document;

data generation means for generating gradation data from the digital image data for monochromatic reproduction on the basis of the mixing coefficients designated by said first or third designation means; and a controller for controlling the gradation data generated by said data generation means on the basis of the first reproduction color designated by said second designation means and the gradation data generated by said data generation means on the basis of the second reproduction color designated by said fourth designation means, so as to generate different gradation colors even if the first reproduction color is the same as the second reproduction color.

27. An image processing apparatus which can process either of a full color image and a monochromatic image, the apparatus comprising:

designation means for designating a reproduction color for representing a monochromatic image of a document;

mode selection means for selecting a mode among a plurality of modes, each of the modes specifying mixing coefficients of the image data of red, green, and blue; and data generation means for generating gradation data, for monochromatic reproduction with said reproduction color designated by said designation means, from the digital image data of red, green, and blue by using the mixing coefficients according to the mode selected by said mode selection means.

28. An image processing method which can process either of a full color image and a monochromatic image, the method comprising the steps of:

(a) selecting one of first designation means and second designation means, said first designation means being for designating first mixing coefficients of digital image data of red, green, and blue of a document and a first reproduction color for representing a monochromatic image of the document, said second designation means being for designating second mixing coefficients of the image data of red, green, and blue and a second reproduction color for representing a monochromatic image of the document, said second mixing coefficients being different from the first mixing coefficients; and (b) generating gradation data for monochromatic reproduction from the digital image data of red, green, and blue by using the one of the first mixing coefficients and the second mixing coefficients which is selected by the step (a).

29. An image processing method which can process either of a full color image and a monochromatic image, the method comprising the steps of:

(a) designating each of mixing coefficients of digital image data of red, green, and blue; and (b) generating gradation data for monochromatic reproduction from the digital image data of red, green, and blue by using the mixing coefficients designated in the step (a).

30. An image processing method which can process either of a full color image and a monochromatic image, the method comprising the steps of:

(a) determining a document type according to digital image data of a document;

(b) storing a plurality of mixing coefficients of the image data of red, green, and blue in a memory, wherein mixing coefficients are provided for each of document types to be determined by said document type determination means;

(c) supplying one of said mixing coefficients, according to the document type determined in the step (a), from said memory; and (d) generating gradation data for monochromatic reproduction from the digital image data by using mixing coefficients supplied in step (c).

31. An image processing method which can process either of a full color image and a monochromatic image, the method comprising the steps of:

(a) designating a reproduction color for representing a monochromatic image of the document;

(b) selecting a mode among a plurality of modes, each of the modes specifying mixing coefficients of the image data of red, green, and blue; and (c) generating gradation data, for monochromatic reproduction with said reproduction color designated by said designation means, from the digital image data of red, green, and blue by using the mixing coefficients corresponding to the mode selected in step (b).

* * * * *

UNITED STATES PATENT AND TRADEMARK OFFICE

CERTIFICATE OF CORRECTION

PATENT NO. : 5,973,802
APPLICATION NO. : 08/611754
DATED : October 26, 1999
INVENTOR(S) : Yoshihiko Hirota et al.

It is certified that error appears in the above-identified patent and that said Letters Patent is hereby corrected as shown below:

Column 12, claim 1, line 25, delete “the image”, and insert --the digital image--.

Column 12, claim 1, line 36, delete “using the one”, and insert --using one--.

Column 12, claim 1, line 41, delete “with the one”, and insert --with one--.

Column 12, claim 3, line 52, delete “to visual”, and insert --to a visual--.

Column 12, claim 4, line 55, delete “the image”, and insert --the digital image--.

Column 13, claim 8, line 15, delete “to visual”, and insert --to a visual--.

Column 13, claim 12, lines 43-44, “received from said image reading means” should be deleted.

Column 14, claim 17, line 38, delete “of document types”, and insert --document type--.

Column 14, c1aim 18, line 53, delete “of visual”, and insert --according to a visual--.

Column 15, claim 20, line 13, delete “to visual”, and insert --to a visual--.

Column 15, claim 21, line 34, delete “using the one”, and insert --using one--.

Column 15, claim 24, line 65, delete “each of”, and insert --each--.

Column 16, claim 24, line 1, delete “types”, and insert --type --.

Column 16, claim 25, line 12, delete “coefficients of visual”, and insert --coefficients according to a visual--.

Column 17, claim 28, line 11, delete “using the one”, and insert --using one--.

Column 17, claim 28, line 12, after “coefficients”, should be inserted --,--.

UNITED STATES PATENT AND TRADEMARK OFFICE

CERTIFICATE OF CORRECTION

PATENT NO. : 5,973,802
APPLICATION NO. : 08/611754
DATED : October 26, 1999
INVENTOR(S) : Yoshihiko Hirota et al.

It is certified that error appears in the above-identified patent and that said Letters Patent is hereby corrected as shown below:

Column 18, claim 30, line 4, delete “each of document”, and insert --each document--.

Column 18, claim 31, line 17, delete “mode among”, and insert --mode from among--.

Signed and Sealed this

Twenty-fourth Day of October, 2006

JON W. DUDAS

*Director of the United States Patent and Trademark Office*